United States Patent [19]

Jacobsen

[11] 4,041,560
[45] Aug. 16, 1977

[54] METHOD AND DEVICE FOR DEWATERING OF SUSPENSIONS IN MOVEMENT

[75] Inventor: Finn Jacobsen, Karlstad, Sweden
[73] Assignee: Kamry AB, Karlstad, Sweden
[21] Appl. No.: 676,660
[22] Filed: Apr. 13, 1976
[30] Foreign Application Priority Data
 Apr. 15, 1975 Sweden ............................... 7504309
[51] Int. Cl.² ...................... B01D 33/00; D21C 9/18; D21D 5/22
[52] U.S. Cl. .................................... 8/156; 68/181 R; 162/60; 162/251; 210/77; 210/82; 210/388; 210/391
[58] Field of Search ............................ 162/55, 60, 251; 210/77, 82, 388, 389, 391, 393; 68/174, 181 R, 182, 184; 8/156

[56] References Cited
U.S. PATENT DOCUMENTS

| | | | |
|---|---|---|---|
| 3,372,087 | 3/1968 | Richter | 162/251 |
| 3,579,420 | 5/1971 | Richter | 162/251 X |
| 3,595,038 | 7/1971 | Bergholm et al. | 68/181 R |

*Primary Examiner*—Richard V. Fisher
*Attorney, Agent, or Firm*—Cushman, Darby & Cushman

[57] ABSTRACT

A method and apparatus for the thickening of a suspension of comminuted fiber material and liquid. A reciprocal screen assembly having a variable volume interior chamber is mounted for movement along the axis of a container through which suspension to be dewatered flows. Mechanical apparatus, such as a hydraulic cylinder actuated rod, moves the screen assembly in either the direction of flow of suspension in the container, or in the direction opposite thereto, and the screen assembly is relatively rotatable with respect to the container. During movement of the screen assembly in the direction of flow of the suspension (at about the same velocity as the suspension flow), liquid passes through the screen assembly into the interior chamber, and is expelled from the container. The screen assembly is moved more quickly in the direction opposite to the direction of suspension flow, and the variable volume of the interior chamber thereof decreases quickly so that backflushing of the screen assembly is effected. Even during backflushing, however, liquid is continuously moved from the interior screen chamber to be expelled from the container. Fins mounted on the screen assembly effect relative rotational movement of the screen assembly with respect to the container (to facilitate cleaning of the screen assembly) during movement in the direction opposite to the direction of suspension flow.

17 Claims, 1 Drawing Figure

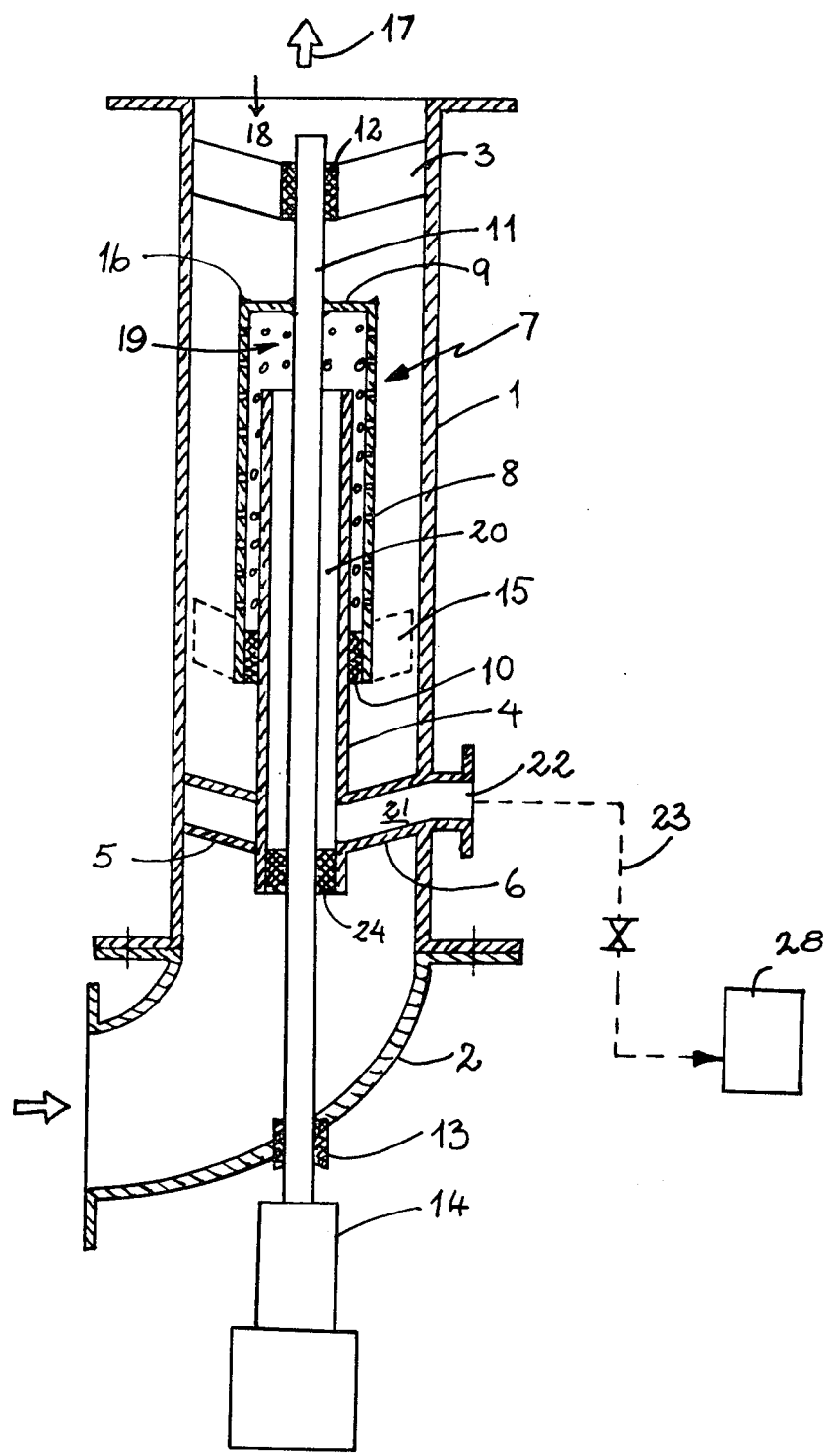

METHOD AND DEVICE FOR DEWATERING OF SUSPENSIONS IN MOVEMENT

BACKGROUND AND SUMMARY OF THE INVENTION

The present invention relates to a method and apparatus for thickening and dewatering of suspensions, especially suspensions of comminuted fiber material and liquid. There are numerous prior art devices and methods for thickening suspensions, such as shown in U.S. Pat. Nos. 3,595,038 and 3,579,420, however, such prior art devices often have a number of problems associated therewith. When the particles of fibers in the suspension are small there is a tendency for the fiber material to accumulate on screening devices and the like, causing blockage thereof. While screen cleaning can be accomplished in a number of different ways, such as by the use of scrapers or doctor blades, complicated pumps and valve members for effecting backflushing, and the like, such prior art devices are generally complicated.

According to the present invention, a method and apparatus have been provided which has numerous advantages compared with most prior art structures. According to the present invention, the liquid (filtrate) separated from the suspension flows continuously away from the container through which the suspension moves, and no pressure tanks and valves, pumps, and the like are necessary for backflushing of the screens. The pressure distribution in a cylindrical screen body according to the present invention, is essentially ideal, the liquid being evenly extracted through the screen body and the pressure being evenly distributed across the screen body. Since no accessory liquid from outside sources, pumps, and the like is necessary to effect backflushing according to the present invention, pressure shocks that commonly arise in the apparatus and are transferred to the suspension are avoided. The device according to the present invention also may undergo a radial movement, which further facilitates screen cleaning, and the device according to the present invention is in general compact in design and easy to construct and maintain. The apparatus according to the present invention may readily be installed in pipe shaped containers (i.e., with diameters of about 500 millimeters) so that thickening may take place directly in pipes for transmitting the suspension. Also, according to the present invention, the suspension may be thickened despite the fact that it is at super atmospheric pressure, and at temperatures above 100° C.

According to the present invention, apparatus for dewatering suspension is provided comprising a generally cylindrical container throughwhich the suspension to be dewatered flows in a first direction, screen means for removal of a portion of the liquid from the suspension flowing through th container, the screen means having an interior variable volume chamber, mechanical means for reciprocating the screen means in the first direction and in a second direction opposite to the first direction so that the volume of the interior chamber of the screen means is varied, and means connected to the interior chamber of the screen means for expelling liquid separated from the suspension to an area remote from the container. The screen means preferably comprises a tubular screen member that is slidable over a tubular member stationarily mounted to the container. A rod member, supported by bushings in the container and the stationary tubular member, extends through the stationary tubular member and is connected to the tubular screen member at a closed end portion thereof. The rod member comprises the mechanical means for reciprocating the screen means, and the rod member may be connected to a hydraulic cylinder or the like. Preferably, the screen means is moved more quickly in the second direction than in the first direction so that backflushing of the screen member takes place. Separated liquid is continuously removed from the container, even during movement of the screen member in the second direction. Also, the screen member may be rotated during movement in the second direction to further facilitate screen cleaning.

According to the method of the present invention, dewatering of the suspension of comminuted fiber material and liquid may be effected; according to the method of the present invention the following steps are effected: A flow of suspension of comminuted fiber material and liquid in a first direction in a container is established, reciprocal screen means having a variable volume interior chamber is mechanically moved in the first direction at about the speed of flow of suspension in the first direction so that liquid to be removed from the suspension flows through the screen means into the interior chamber thereof, the separated liquid is continuously removed from the container to an area remote from the container, the screen means is mechanically moved in a second direction opposite to the first direction to decrease the volume of the interior chamber of the screen means while continuously effecting removal of the separated liquid from the container to an area remote from the container, and the above method steps are continuously repeated while continuously effecting removal of separated liquid from the container. The suspension may be at super atmospheric pressure when flowing in the container and at a temperature above 100° C, and preferably the suspension is thickened from a solids concentration of about 2–6% to 8–12%.

It is the primary object of the present invention to provide an improved method and apparatus for the thickening of a suspension of comminuted fiber material and liquid. This and other objects of the invention will become clear from an inspection of the detailed description of the invention and the appended claims.

BRIEF DESCRIPTION OF THE DRAWING

The drawing is a cross-sectional view of exemplary apparatus according to the present invention for thickening a suspension of comminuted fiber material and liquid.

DETAILED DESCRIPTION OF THE INVENTION

Apparatus according to the present invention generally comprises a generally cylindrical container 1 through which suspension to be dewatered flows in a first direction 17, the container having an axis extending generally parallel to the first direction 17, screen means 7 for removal of a portion of the liquid from the suspension flowing through the container 1, the screen means 7 having an interior variable volume chamber 19, mechanical means 11 for reciprocating the screen means 7 in the first direction 17 and in a second direction 18 opposite to the first direction 17 so that the volume of the interior chamber 19 of the screen means 7 is varied, and means 22 connected to the interior chamber 19 of the screen means 7 for expelling liquid separated from the suspension to an area remote from the container 1.

The container 1 may comprise a pipe member of a diameter of about 500 millimeters, having an inlet 2 thereto. Within the container 1 there is disposed a stationary tubular member 4, supported at one end thereof by a plurality of radially extending arm members 5, 6, at least one of the radially extending arm members having an opening 21 formed therethrough. Mounted for movement over the stationary tubular member 4 is a screen means 7, the screen means comprising a tubular screen member 8 having one end, 9, thereof closed, and the other end thereof open, a sealing means 10 being provided at the open end for engagement with the exterior of tubular stationary member 4 during reciprocal movement of the member 8 with respect to the member 4. An interior variable volume chamber 19 defined by the closed end 9, the tubular member 8, and the stationary tubular member 4, is provided. A rod 11 is also provided operatively connected to the tubular screen member 8 at closed end 9 thereof for providing mechanical reciprocation of the screen means in the first direction 17 and in the second direction 18. The rod member 11 is mounted for reciprocation by bushings 12, 24, and 13, the bushing 12 being mounted by a spider member 3 operatively connected to the container 1, the bushing 24 being supported by the stationary tubular member 4, and the bearing 13 extending through the portion 2 of container 1.

The rod member 11 may be reciprocated by any suitable means such as a hydraulic piston 14 shown in the drawing. The hydraulic piston and cylinder 14 is so arranged that during movement of the screen means 7 in the first direction 17, the screen means 7 moves with substantially the same velocity as the suspension flowing in direction 17 in container 1, and during movement of the screen means 7 in direction 18, the screen means 7 is moved with a substantially greater velocity. The velocity of the rod member 11 in the second direction is large enough so that the variable volume interior chamber 19 of the screen means 7 decreases at a rate with respect to the rate of movement of liquid into the interior chamber 19 through the screen member 8 so that backflushing of the screen member 8 takes place. During the backflushing operation, however, liquid will continuously flow through the chamber 20 of the hollow stationary tubular member 4, through opening 21 to an area remote from the container 1. The hydraulic piston and cylinder 14 is also arranged so that the rod member may rotate with respect to the container 1, and means are provided mounted on screen member 8 that effect rotary movement of the screen member 8 when it is moving in direction 18. Such means may take the form of a plurality of wing shaped vanes for fins 15 which can be twisted or angled so that upon relative movement of the member 8 with respect to the suspension flowing through the container 1 the member 8 is rotated. This relative rotation also facilitates cleaning of the screen 8. Additionally, there is also associated with the screen means 7, means for generating a turbulence in the suspension when the screen means 7 is moved with respect thereto. The turbulence has a positive influence in that if a plurality of screen means 7 are provided in series in the container 1, different portions of the suspension will be brought into operative association with the succeeding screen means 7. The turbulence inducing means may comprise a tooth portion 16 of the closed end 9 of the screen means 7, or a circular edge member of the closed end 9, the means 16 also effecting a shredding or mixing of the suspension.

Liquid that is separated out from the suspension flowing in container 1 flows into chamber 19 through chamber 20 in stationary tubular member 4, through opening 21, and outlet 22 to outlet line 23. The line 23 may be connected to any suitable storage or recycling means, such as a reservoir 28. The line 23 may also have disposed therein conventional pressure resistance devices and flow quantity regulators (not shown).

Exemplary apparatus according to the present invention now having been described, an exemplary operation thereof will be setforth. Suspension to be dewatered, at approximately 2-6% solids concentration, flows in direction 17 through elbow portion 2 of container 1 into the container 1. The rod member 11 is moved upwardly in direction 17 at substantially the same velocity as the suspension flowing in container 1 by the hydraulic piston and cylinder arrangement 14 or the like, and during this upward movement liquid flows through the openings in the tubular movable screen member 8 into the variable volume interior chamber 19 thereof, through interior passageway 20 in stationary tubular member 4, through opening 21, and into outlet line 23. When the screen means 7 has reached its upward limit of travel (as by closed end 9 thereof abutting bushing 12) the hydraulic cylinder moves the rod member 11 downwardly in direction 18 with a velocity greater than the upward velocity of the suspension in container 1, and relative rotation of the rod member 11 with respect to the container 1 is effected during this movement in direction 18 by the force of the suspension acting on fins 15 (the rotation during each downward movement is approximately 120–240°). The movement in direction 18 is with a velocity great enough so that the variable volume of the interior chamber 19 decreases at a rate with respect to the rate of movement of liquid into the interior chamber 19 through the screen means 7 so that backflushing of the screen member 8 takes place. Turbulence in the suspension is also generated by the means 16 associated with screen means 7. During the downward movement of the screen means 7 in direction 18, liquid is continuously expelled through the opening 21 into outlet line 23. When the screen means 7 reaches its downward limit of travel (as by portion 10 thereof abutting arm member 5, 6) the hydraulic cylinder and piston arrangement is again operated to move the rod member 11 upwardly in direction 17, and the process is continued and repeated. The length of the stroke of movement of the rod member 11 in either direction is relatively small, for example 0–100 centimeters, preferably 20–50 centimeters; the stroke can suitably be approximately ½ the length of screen member 8.

It will be seen that according to the present invention an apparatus and method have been provided that provide for greatly simplified thickening or dewatering of suspensions, requiring no accessory liquid sources, pumps, valves, and the like, for effecting backflushing and cleaning of the dewatering screen.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for dewatering a suspension comprising a generally cylindrical container through which suspension to be dewatered flows in a first direction, said container having an axis extending generally parallel to said first direction, screen means for removal of a portion of the liquid from the suspension flowing through said container, said screen means extending generally along the axis of said container in which it is disposed and defining an interior variable volume chamber, the interior volume of said cylindrical container including said screen means remaining constant but the interior volume of said screen means interior chamber being variable within said container volume, mechanical means for reciprocating a portion of said screen means in said first direction and in a second direction opposite to said first direction so that the volume of said interior chamber of said screen means is varied by said reciprocation, and means connected to the interior chamber of said screen means for expelling liquid separated from said suspension to an area remote from said container.

2. Apparatus as recited in claim 1 wherein said screen means comprises a generally tubular screen member having an axis substantially coincident with the axis of said container and having an open end thereof that is in sliding sealing engagement with a generally tubular stationary member within said container, and having a closed end thereof opposite said open end thereof, said portion of said screen means being reciprocated comprising said tubular screen member, and, said interior variable volume chamber of said screen means being defined by the volume between said closed end of said tubular screen member, said tubular stationary member, and the inside walls of said tubular screen member.

3. Apparatus as recited in claim 2 wherein said mechanical means for reciprocating said screen means portion comprises a rod member extending through said stationary tubular member and supported by bushings that are stationary with respect to said container, and operatively connected to said tubular screen member closed end.

4. Apparatus as recited in claim 3 wherein said rod member is actuated for reciprocation in said first and second directions by a hydraulic cylinder.

5. Apparatus as recited in claim 3 wherein said rod member is reciprocated by means for reciprocating it more quickly in said second direction than in said first direction, and wherein the speed of reciprocation in said second direction is large enough so that the variable volume interior chamber of said screen means decreases at a rate with respect to the rate of movement of liquid into said interior chamber through said screen means so that backflushing of said screen takes place.

6. Apparatus as recited in claim 3 wherein said bushings support said rod member for relative rotation with respect to said container as well as the reciprocation with respect thereto, and wherein said screen means has means associated therewith for imparting relative rotation to said tubular screen member during movement of said tubular screen member in said second direction.

7. Apparatus as recited in claim 6 wherein said means for imparting relative rotation to said tubular screen member during movement thereof in said second direction includes a plurality of fins connected to said tubular screen member and disposed in the flow of suspension in said container.

8. Apparatus as recited in claim 2 further comprising means for generating turbulence in said suspension during movement of said tubular screen member.

9. Apparatus as recited in claim 8 wherein said turbulence generating means comprises a toothed portion of said tubular screen member extending axially from the closed end of said screen member.

10. Apparatus as recited in claim 1 wherein said container axis extends vertically and wherein the suspension flowing in said container flows upwardly.

11. Apparatus as recited in claim 1 further comprising means for limiting the movement of said screen means in either said first or said second directions to a stroke of 20–50 cm.

12. A method of dewatering a suspension of comminuted fiber material and liquid utilizing a mechanically reciprocal screen means extending along the axis of a generally cylindrical container in which it is disposed and through which suspension to be dewatered flows, the screen means defining a variable volume interior chamber, the interior volume of said cylindrical container including said screen means remaining constant but the interior volume of said screen means interior chamber being variable within said container volume, comprising the steps of a. establishing a flow of suspension of comminuted fiber material and liquid in a first direction in the container, b. mechanically moving a portion of the screen means in said first direction at about the speed of flow of suspension in said first direction so that liquid to be removed from the suspension flows through the screen means into the interior chamber thereof, c. removing the separated liquid from the container to an area remote from the container, and d. mechanically moving the portion of the screen means in a second direction opposite to the first direction to decrease the volume of the interior chamber of the screen means while continuously effecting removal of the separated liquid from the interior chamber.

13. A method as recited in claim 12 comprising the step of moving said portion of said screen means more quickly in said second direction that in said first direction.

14. A method as recited in claim 12 wherein the suspension is at super atmospheric pressure when flowing in said container and at a temperature above 100° C.

15. A method as recited in claim 12 comprising the futher step of imparting a rotational movement to said portion of said screen means when moving in said second direction to facilitate cleaning of said screen means.

16. A method as recited in claim 12 wherein said suspension is at about 2–6% solids concentration when it enters the container and is thickened to about 8–12% solids concentration when it exits the container.

17. A method as recited in claim 12 comprising the step of backflushing the screen means during movement of said portion of said screen means in said second direction by moving said portion of said screen in said second direction so that the variable volume interior chamber of said screen means decreases at a rate with respect to the rate of movement of liquid into said interior chamber through said screen means so that liquid flows outwardly of the interior chamber through said screen means.

* * * * *